Patented Sept. 22, 1936

2,055,456

UNITED STATES PATENT OFFICE 2,055,456

PROCESS AND PRODUCT RELATING TO OLEFIN DERIVATIVES

Egon Eichwald, Amsterdam, Netherlands, assignor to Shell Development Company, San Francisco, Calif.

No Drawing. Application September 29, 1932, Serial No. 635,344. In the Netherlands October 6, 1931

17 Claims. (Cl. 260—112)

The invention relates to a process for the production of valuable products from mono-olefine hydrocarbons and more specifically is concerned with the condensation of these mono-olefines with compounds containing the resinophore grouping C=C—C=O wherein each of the loose bonds is attached to a univalent substituent and is also concerned with the products resulting therefrom.

It is known to subject easily polymerizable substances, such as vinyl compounds and diolefines having a conjugated double bond, to a condensation reaction with other polymerizable substances. In this way, resinous products are obtained. The initial materials of these known processes are, however, relatively expensive, so that cheaper initial materials have been sought for.

I have found that also mono-olefines (normal or iso) which can only be polymerized with difficulty, such as ethylene, propylene, butylene, amylene, hexylene, etc., or products containing these substances such as "cracked distillate" may be polymerized intermolecularly with an unsaturated organic compound containing at least one carbonyl or carboxyl group and very advantageously with substances having a double bond between two carbon atoms conjugated with one or more carbonyl or carboxyl groups to products having many useful applications. That is to say, it has appeared that not only substances such as vinyl compounds but also aliphatic mono-olefines, whether of secondary or tertiary character, may be condensed with substances such as maleic acid, crotonic acid, cinnamaldehyde, crotonaldehyde, acrolein, quinone, naphthoquinone, toluquinone, phorone, benzalacetone, furfural, mesityl oxide, citraconic acid, cinnamic acid, itaconic acid, fumaric acid, piperic acid, aconitic acid, acrylic acid, methylene ketone, ketenes, dibenzylidene acetone, dianisylidene acetone, difurfural acetone, piperonylidene cinnamylidene acetone, coumarin, uric acid, caffein, propiolic acid, oleic acid, elaidic acid, phenylpropialic acid, etc., their homologues, analogues and esters and anhydrides of the above acids, their homologues and analogues. In comparison with known processes, the reaction temperature employed in carrying the present invention into effect is, generally speaking, higher; this temperature lies generally about 160° C.

In the present specification, the expression "cracked distillate" signifies a distillate obtained during cracking of hydrocarbon oils or gases. It is composed of a high or substantial proportion of unsaturated hydrocarbon compounds, generally about 15% or 50% or more by weight of such unsaturated hydrocarbons being present in the distillate although it is to be understood that the proportion of unsaturated hydrocarbons, with respect to the total quantity of distillate, is dependent upon the method utilized in the cracking.

According to my process, it has now become practicable to convert products which are much cheaper in price as compared with hitherto known initial materials into valuable products. Further, cracked distillate, which may be used according to the invention, is not only cheap but also available in large quantities.

The process may be carried into effect by placing the requisite quantities of the reagents taking part in the inter-molecular polymerization in an autoclave, which is sealed and then heated by any method, including that by steam, to the desired temperature of polymerization. The initial materials may be caused to react in any proportion. In order to carry the reaction through as fas as possible, it is preferred to use an excess of the cheapest components.

The temperature of polymerization is governed by the critical data of the hydrocarbons and/or of the unsaturated substances which contain either a carbonyl or carboxyl group; the rate of polymerization increases as the temperature is raised. The higher the temperature of polymerization the more brittle and less rubber-like is the product, because at higher temperatures, although polymerization may be complete, the magnitude of the polymerized micelle or colloid unit, of which the structure is built, is smaller than that obtained by polymerizing at a lower temperature.

Both the temperature and time before polymerization is complete are governed by the particular mixture. By raising the temperature, the time of polymerization may be appreciably shortened.

Polymerization catalysts such as sodium or sodium amalgam may be used to shorten the time of polymerization or polymerization may be assisted or accelerated by irradiation with ultra violet light.

Solvents, as for example, alcohols or esters, acid anhydrides, resins, cellulose derivatives, fillers, dyestuffs, softening agents, and the like, may be added before or during the polymerization.

Threads, films, coatings, priming compositions and the like, can be prepared from the products and used in the arts dealing with synthetic resins, pharmaceutical preparations, plasticizing means, lacquers, insulating materials, etc.

The obtained products may vary greatly in character dependent on the nature of the substances used as well as the proportions of the components employed.

For purposes of illustration only, reference will be had to several examples which typify the invention:

*Example I*

Amylene is heated with 20% by weight of maleic acid anhydride during 2 hours at 180° C. in an autoclave. After cooling, the non-converted amylene is distilled off and the residue is treated with a caustic alkali solution of 10% strength. In this way, two liquid phases are being formed. The upper phase, which is relatively small, consists of oily polymerization products. The aqueous phase is separated from the upper phase, after which the dibasic acids formed in the reaction are precipitated with a mineral acid (hydrochloric, sulphuric acid, etc.). By means of recrystallization from water the amylene-succinic acid may be obtained in the pure state.

The over all equation of reaction taking place is as follows:

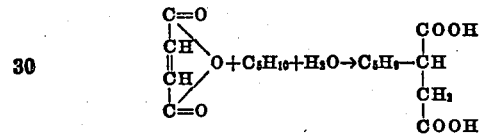

It is realized that the reaction between amylene and maleic acid anhydride results in the formation of the anhydride of amylene-succinic acid, which by the subsequent treatment with a lye solution is converted into the alkali salt of amylene-succinic acid. From this salt the free acid is then obtained by means of the mineral acid.

*Example II*

Cracked benzine is heated with 20% by weight of maleic acid anhydride at 200° C. in an autoclave during 2 to 3 hours. After cooling, the mass is treated with so much caustic alkali of 10% strength that the formed acids dissolve. The mass is subsequently boiled with a reflux cooler. Having been left for some time to itself, two liquid phases are formed, an aqueous bottom phase and an oily upper phase. The aqueous phase is isolated after which a sufficient quantity of sulphuric or hydrochloric acid is added thereto. The substituted succinic acid separates thereby and may be further purified.

It depends on the nature of the cracked benzine used whether the produced acid possesses an oily or a crystalline character. This is, however, of no importance for the further handling of the product.

*Example III*

Di-isobutylene, obtained by the polymerization of isobutylene, is heated with 30% by weight crotonic aldehyde at 210° C. in an autoclave. After cooling, the mass is taken up in a sodium-bisulphite lye. Two phases are formed again. The aqueous phase is subsequently treated with a soda solution or with dilute sulphuric acid which causes the aldehydes formed in the reaction to separate. They may be purified by distillation.

While I have in the foregoing described in some detail the preferred embodiment of my invention and some variants thereof, it will be understood that this is only for the purpose of making the invention more clear and that the invention is not to be regarded as limited to the details of operation described, nor is it dependent upon the soundness or accuracy of the theories which I have advanced as to the reasons for the advantageous results attained. On the other hand, the invention is to be regarded as limited only by the terms of the accompanying claims, in which it is my intention to claim all novelty inherent therein as broadly as is possible in view of the prior art.

What I claim is:

1. The process of making valuable products from aliphatic compounds containing a single ethylene linkage which comprises: reacting together an aliphatic compound containing a single ethylene linkage and a compound of the class consisting of unsaturated aldehydes, unsaturated ketones, unsaturated carboxylic acids, unsaturated carboxylic acid anhydrides and esters of unsaturated carboxylic acids under a substantial superatmospheric pressure.

2. The process of making valuable products from aliphatic mono-olefines which comprises: reacting together an aliphatic mono-olefine and an unsaturated aliphatic organic compound containing a carbonyl group under a substantial superatmospheric pressure.

3. The process of making valuable products from aliphatic mono-olefines which comprises: reacting together an aliphatic mono-olefine and an unsaturated aliphatic organic compound having a double bond conjugated with at least one carbonyl group under a substantial superatmospheric pressure.

4. The process of making valuable products from aliphatic mono-olefines which comprises: reacting together an aliphatic mono-olefine and an unsaturated carboxylic acid.

5. The process of making valuable products from aliphatic mono-olefines which comprises: reacting together an aliphatic mono-olefine and an unsaturated carboxylic acid ester.

6. The process of making valuable products from aliphatic mono-olefines which comprises: reacting together an aliphatic mono-olefine and an unsaturated organic compound having at least one carbonyl group with heating and under a substantial superatmospheric pressure.

7. The process of making valuable products from aliphatic mono-olefines which comprises: reacting together an aliphatic mono-olefine and an unsaturated organic compound possessing the grouping

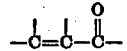

with heating and under a substantial superatmospheric pressure.

8. A composition of matter resulting from reacting together an aliphatic mono-olefine and an unsaturated organic acid having a double bond conjugated with at least one carbonyl group.

9. A composition of matter resulting from reacting together an aliphatic mono-olefine and an unsaturated carboxylic acid ester.

10. A composition of matter resulting from reacting together an aliphatic mono-olefine and an unsaturated organic ketone.

11. The process of making valuable products from cracked distillate which comprises: reacting together cracked distillate and an unsaturated organic compound having at least one carbonyl group.

12. The process of making valuable products from cracked distillate which comprises: reacting together cracked distillate and an organic compound possessing the resinophore grouping $$-C=C-C=O.$$

13. The process of making valuable products from cracked distillate which comprises: reacting together cracked distillate and an unsaturated organic compound having at least one carbonyl group with heat and under superatmospheric pressure.

14. A composition of matter resulting from reacting together cracked distillate and an unsaturated organic compound having at least one carbonyl group.

15. A process for the production of valuable products which comprises reacting an aliphatic compound containing a single olefinic linkage with a compound of the class consisting of unsaturated aldehydes, unsaturated ketones, unsaturated carboxylic acids, unsaturated carboxylic acid anhydrides and esters of unsaturated carboxylic acids, said reaction being effected at a temperature of at least 160° C.

16. A process for the production of valuable products which comprises reacting an organic compound containing a single olefinic linkage, which olefinic linkage is between two aliphatic carbon atoms one of which is tertiary, with a compound of the class consisting of unsaturated aldehydes, unsaturated ketones, unsaturated carboxylic acids, unsaturated carboxylic acid anhydrides and esters of unsaturated carboxylic acids.

17. A composition of matter resulting from reacting together an aliphatic mono-olefine and an unsaturated carbonylic compound wherein the carbonyl group is linked directly to a substituent Y which represents a member of the group consisting of hydrogen and hydroxy.

EGON EICHWALD.